(12) United States Patent
Hu et al.

(10) Patent No.: US 11,820,711 B2
(45) Date of Patent: Nov. 21, 2023

(54) ENVIRONMENT-FRIENDLY CEMENT SELF-REPAIRING SYSTEM, ITS PREPARATION METHOD AND APPLICATION

(71) Applicant: Tianjin University, Tianjin (CN)

(72) Inventors: MiaoMiao Hu, Tianjin (CN); Yujie Ying, Tianjin (CN); Jintang Guo, Tianjin (CN); Jingmin Han, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/122,884

(22) Filed: Mar. 17, 2023

(65) Prior Publication Data
US 2023/0295044 A1    Sep. 21, 2023

(30) Foreign Application Priority Data
Mar. 18, 2022    (CN) .......................... 202210267890.7

(51) Int. Cl.
*C04B 26/14*    (2006.01)
*C04B 16/02*    (2006.01)
(Continued)

(52) U.S. Cl.
CPC .............. *C04B 26/14* (2013.01); *C04B 16/02* (2013.01); *C04B 22/124* (2013.01);
(Continued)

(58) Field of Classification Search
CPC . C08L 63/00–10; C04B 26/14; C04B 24/281; C04B 24/38; C04B 24/121–123;
(Continued)

(56) References Cited

U.S. PATENT DOCUMENTS

2022/0251432 A1*    8/2022    Yang .................. C09J 7/385

FOREIGN PATENT DOCUMENTS

CN    108409178 A    8/2018
CN    108840586 A    11/2018

OTHER PUBLICATIONS

Ying et al., "Self-healing in cementitious system using interface enhanced capsules prepared at room temperature," J. Cleaner Prod. 395, 136465 (available online Feb. 2023).*

* cited by examiner

*Primary Examiner* — Kregg T Brooks
(74) *Attorney, Agent, or Firm* — WPAT, P.C

(57) ABSTRACT

The invention discloses an environment-friendly cement self-repairing system, and its preparation method and application. The preparation method comprises the following steps: adding a shell curing agent into deionized water to prepare solution 1, adding an inorganic nano emulsifier into deionized water, ultrasonically dispersing, then adding polysaccharide-shell, and uniformly stirring to obtain emulsion polymerization aqueous phase; adding epoxy diluent into epoxy resin, and uniformly stirring; obtaining an emulsion polymerization oil phase; mixing the emulsion polymerization aqueous phase and emulsion polymerization oil phase, and stirring to obtain uniform emulsion; dropping the uniform emulsion into solution drop by drop by using pendant drop method, stirring until the droplets are shaped, then filtering, washing with deionized water, and drying to obtain self-repairing capsules; next, mixing with an environment-friendly curing agent to obtain an environment-friendly cement self-repairing system. The environment-friendly cement self-repairing system is green, nontoxic and harmless, has strong water absorption, can block tiny cracks by (Continued)

volume expansion when contacts with water, thus further enhances the cement self-repairing effect.

4 Claims, 4 Drawing Sheets

(51) Int. Cl.
  *C04B 22/12*    (2006.01)
  *C04B 22/14*    (2006.01)
  *C04B 24/02*    (2006.01)
  *C04B 24/12*    (2006.01)
  *C04B 24/28*    (2006.01)
  *C04B 24/38*    (2006.01)
  *C04B 40/06*    (2006.01)
  *C04B 103/40*   (2006.01)
  *C04B 111/00*   (2006.01)
  *C04B 111/10*   (2006.01)

(52) U.S. Cl.
  CPC .......... *C04B 22/143* (2013.01); *C04B 24/023* (2013.01); *C04B 24/122* (2013.01); *C04B 24/123* (2013.01); *C04B 24/281* (2013.01); *C04B 24/38* (2013.01); *C04B 40/0675* (2013.01); *C04B 2103/408* (2013.01); *C04B 2111/00017* (2013.01); *C04B 2111/1037* (2013.01)

(58) Field of Classification Search
  CPC . C04B 40/0675; C09J 163/00–10; C08J 3/12; C08J 3/122
  See application file for complete search history.

ENVIRONMENT-FRIENDLY CEMENT SELF-REPAIRING SYSTEM, ITS PREPARATION METHOD AND APPLICATION

TECHNICAL FIELD

This invention belongs to an environment-friendly cement self-repairing system, and its preparation method and application.

BACKGROUND

Cement is easy to crack due to various loads and environmental factors, and foreign chemicals can easily further erode cement-based materials through microcracks, resulting in the reduction of strength. At present, the cost of repairing and maintaining cement has become high and the coinciding environmental pollution has increased as well. The chemical sealant sprayed or injected during the repair process is very likely to cause damage to human body. Therefore, the self-repairing ability of cement is directly related to the service life, cost and environmental pollution of cement.

It is the most common method to enhance the self-repairing ability of cement by adding capsules encapsulated with self-repairing agent into cement-based materials, among which epoxy resin is a very common self-repairing agent. By adding self-repairing capsules encapsulated with epoxy resin and epoxy resin curing agent into cement-based materials, a cement self-repairing system with high self-repairing ability can be prepared.

Dong et al. evaluated the self-repairing ability of cement with cracking effect, mechanical properties and chlorine permeability, and by preparing urea-formaldehyde resin/epoxy microcapsules. The experimental results show that the crack repairing rate is in the range of 20.71-45.59%, and the repairing rates of compressive strength and permeability are about 13% and 19.8% respectively, (Dong B, Fang G, Ding W, et al. Self-repairing features in cementitious material with urea-formaldehyde/epoxy microcapsules [J]. Construction and Building Materials, 2016, 106: 608-617).

Jiang et al. uses in-situ polymerization to prepare microcapsule materials with sodium alginate/melamine phenolic resin used as shell and epoxy resin used as core. It is found that composite microcapsules have certain advantages in cost and ecological efficiency, and have good self-repairing ability for micro-cracks in concrete materials, (Jiang W, Zhou G, Wang C, et al. Synthesis and self-repairing properties of composite microcapsule based on sodium alginate/melamine-phenol-formaldehyde resin [J]. Construction and Building Materials, 2021, 271: 121541.). However, the current curing agents for epoxy resin are mainly classified into aliphatic amines, organic acids, anhydrides, etc., but all of them have the defects, including long curing time, strong volatility, toxicity and harm, and the capsules encapsulating self-repairing agents have the disadvantages of difficult synthesis, high cost and industrialization, which cannot meet the self-repairing needs of large quantities of cement.

SUMMARY

The invention aims to provide an environment-friendly cement self-repairing system, in order to overcome the disadvantages of the existing cement self-repairing system, including being toxic and harmful to both human body and environment, and being difficult to synthesis and high costly The second purpose of the invention is to provide a preparation method of an environment-friendly cement self-repairing system.

The third purpose of the invention is to provide an application of an environment-friendly cement self-repair system in cement self-repair.

A preparation method of environment-friendly cement self-repairing system, comprising steps as follows: step 1, preparation of a self-repairing capsule, wherein, 1) preparation of a solution 1: adding an amount of deionized water into a shell curing agent, and uniformly stirring to obtain the solution 1 with the mass fraction of 2.22%-2.72% of the shell curing agent;
2) preparation of an emulsion polymerization aqueous phase: adding an inorganic nano-emulsifier into the deionized water, ultrasonically dispersing for 5-15 min at 20 kHZ, adding a polysaccharide shell, and uniformly stirring to obtain an emulsion polymerization aqueous phase with the mass fraction of inorganic nano-emulsifier of 0.5%-1.5% and the mass fraction of polysaccharide shell of 1%-2.5%;
3) preparation of an emulsion polymerization oil phase: adding an epoxy diluent into an epoxy resin, and stirring evenly, obtaining the emulsion polymerization oil phase with the mass fraction of the epoxy diluent of 10%-20%;
4) preparation of emulsion: mixing the emulsion polymerization aqueous phase obtained in step 2 with the emulsion polymerization oil obtained in step 3 according to the mass ratio of 75-50:25-50, and stirring at 10,000-12,000 rpm to obtain a uniform emulsion;
5) preparation of a self-repairing capsule: dropping the homogeneous emulsion obtained in step 4 into the solution 1 obtained in step 1 by pendant drop method, stirring until the droplets are shaped, and filtering, washing with the deionized water, then drying to obtain self-repairing capsules;

step 2, mixing the self-repairing capsule and an environment-friendly curing agent according to the mass ratio of (2.15-2.54):1 to obtain the environment-friendly cement self-repairing system.

Further, the shell curing agent is calcium chloride, calcium sulfate or aluminum chloride.

Further, the inorganic nano emulsifier is nano silicon dioxide, bentonite or nano calcium carbonate.

Further, the polysaccharide shell material is sodium alginate or xanthan gum.

Further, the epoxy diluent is benzyl glycidyl ether, phenyl glycidyl ether or butyl glycidyl ether.

Further, the environment-friendly curing agent is chitosan, dopamine or lysine.

Further, an environment-friendly cement self-repairing system prepared by the preparation method is provided.

Further, the application of the above-mentioned environment-friendly cement self-repairing system in cement self-repair.

The advantages of the invention are described as follows:

(1) The raw materials of the environment-friendly cement self-repairing system are environment-friendly. When the cement is cracked by external force, the epoxy resin in the self-repairing capsule flows out and solidifies with the environment-friendly curing agent dispersed in the cement, so as to achieve the self-repairing effect. Compared with the traditional cement self-repairing system, it has the characteristics of environmental protection, non-toxic and harmless.

(2) Experiments prove that the environment-friendly cement self-repairing system has strong water absorption, the water absorption rate of the self-repairing capsule reaches more than 110%, and its volume can expand to block tiny cracks when it contacts with water, thus further enhancing the cement self-repairing effect.

(3) Compared with blank cement, the environment-friendly cement self-repairing system of the present invention has significantly improved self-repairing ability, and the compressive strength after repair reaches more than 85% of the compressive strength before presplitting.

The preparation method of the invention is simple, low cost and easy to realize industrial production.

Figure 1:
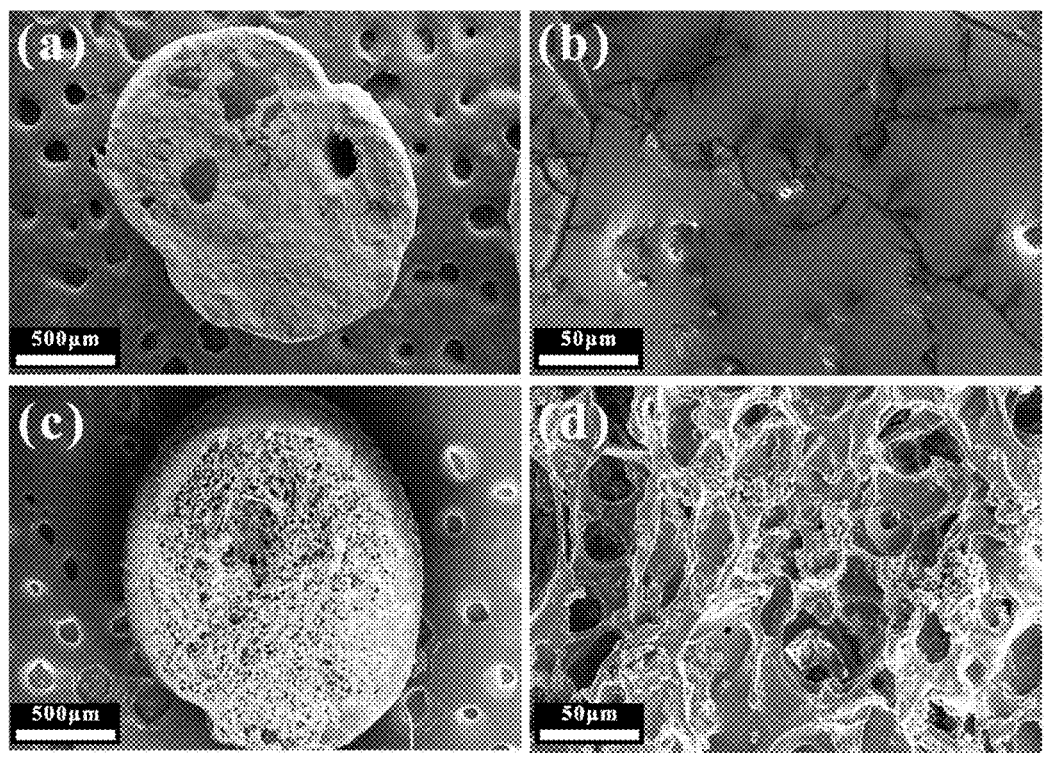
FIG. 1 illustrates a cross-sectional scanning electron microscope diagram of a self-repairing capsule of an environment-friendly cement self-repairing system prepared in Embodiment 1. Wherein (a) is an unwashed cross-sectional view; (b) is an enlarged view of the uncleaned section: (c) is a cross-sectional view after cleaning: (d) is an enlarged view of the section after cleaning.

Calculation formula of repair rate: $\eta=(\sigma 2-\sigma 1)/\sigma 1$. wherein: $\eta$ is the repair rate; $\sigma 2$ is the compressive strength after repair; $\sigma 1$ is the residual compressive strength.

DETAILED DESCRIPTION OF EMBODIMENTS

The present invention will be further explained by specific embodiment.

Ordinary Portland cement (produced by Sichuan Jiahua Enterprise Co., Ltd.) is used in the following embodiment, but the invention is not limited, and ordinary Portland cement produced by other enterprises can also be used in the invention.

Comparative Embodiment

Construction of blank cement system: tap water was added into ordinary portland cement, it was prepared according to GB/T19139-2012 and the cement blank control system was obtained after water curing; the water-cement ratio was 0.44.

Embodiment 1

A preparation method of environment-friendly cement self-repairing system, comprising the following steps:

Step 1 Preparation of self-repairing capsules, comprising the following sub steps:

sub-step 1, preparation of solution 1: calcium chloride was added into deionized water, and uniformly stirred to prepare a solution with the mass fraction of calcium chloride of 2.22% as solution 1;

sub-step 2, preparation of emulsion polymerization aqueous phase: nano-silica was added into deionized water, ultrasonically dispersed for 10 min at 20 kHZ, sodium alginate was added, and uniformly stirred to obtain emulsion polymerization aqueous phase with final mass fraction of nano-silica of 1.5% and final mass fraction of sodium alginate of 2.5%;

Sub-step 3, preparation of emulsion polymerization oil phase: benzyl glycidyl ether was added into epoxy resin and stirred uniformly; then an emulsion polymerization oil phase with the mass fraction of benzyl glycidyl ether of 20% was obtained.

Sub-step 4, emulsion preparation: the emulsion polymerization aqueous phase obtained in step 2 was mixed with the emulsion polymerization oil obtained in step 3) according to the mass ratio of 75:25, and stirred at 12000 rpm to obtain a uniform emulsion (about 10 min);

Sub-step 5, preparation of self-repairing capsules: the homogeneous emulsion obtained in sub-step 4 was dropped into the solution 1 obtained in sub-step 1 by pendant drop method, stirred until the droplets were shaped, filtered, washed with deionized water and dried to obtain self-repairing capsules;

(2) according to the mass ratio of 2.54:1, the self-repairing capsule obtained in step 1 was mixed with chitosan to obtain an environment-friendly cement self-repairing system.

the environment-friendly cement self-repairing system and tap water were added into ordinary portland cement, and prepared according to GB/T19139-2012 and cured in a curing water bath at 30° C.±2° C. for 7 days; the mass ratio of an environmentally friendly cement self-repairing system to ordinary portland cement was 6:94, and the water-cement ratio was 0.4874.

Embodiment 2

A preparation method of environment-friendly cement self-repairing system, comprising the following steps:

(1) preparation of self-repairing capsules, comprising the following sub-steps:

sub-step 1, preparation of solution 1: the same as in step 1 of Embodiment 1;

sub-step 2, preparation of emulsion polymerization aqueous phase: nano-silica was added into deionized water, ultrasonically dispersed for 10 min at 20 kHZ, sodium alginate was added, and uniformly stirred to obtain emulsion polymerization aqueous phase with final mass fraction of nano-silica of 2% and final mass fraction of sodium alginate of 2.5%;

sub-step 3, 4 and 5 are the same as sub step 3, 4 and 5 described in step 1 of Embodiment 1;

Step 2, according to the mass ratio of 2.6:1, the self-repairing capsule obtained in step 1 was mixed with chitosan to obtain an environment-friendly cement self-repairing system.

The environment-friendly cement self-repairing system and tap water were added into ordinary portland cement, and prepared according to GB/T 19139-2012 and cured in a curing water bath at 30° C. 2° C. for 7 days; the mass ratio of an environment friendly cement self-repairing system to ordinary portland cement was 6:94, and the water-cement ratio was 0.4879.

Embodiment 3

A preparation method of environment-friendly cement self-repairing system, comprising the following steps:
step 1, preparation of self-repairing capsules, comprising the following sub-steps:
sub-step 1, preparation of solution 1: the same as in sub step 1 of Embodiment 1;
sub-step 2, preparation of emulsion polymerization aqueous phase: nano-silica was added into deionized water, ultrasonically dispersed for 10 min at 20 kHZ, sodium alginate was added, and uniformly stirred to obtain emulsion polymerization aqueous phase with final mass fraction of nano-silica of 2% and final mass fraction of sodium alginate of 2.5%;
sub-step 3, 4 and 5 are the same as sub step 3, 4 and 5 described in step 1 of Embodiment 1;
according to the mass ratio of 2.6:1, the self-repairing capsule obtained in step 1 was mixed with chitosan to obtain an environment-friendly cement self-repairing system.

The environment-friendly cement self-repairing system and tap water were added into ordinary portland cement, and prepared according to GB/T19139-2012 and cured in a curing water bath at 30° C.±2° C. for 7 days; the mass ratio of an environment friendly cement self-repairing system to ordinary portland cement was 6:94, and the water-cement ratio was 0.4743.

Embodiment 4

A preparation method of environment-friendly cement self-repairing system, comprising the following steps:
step 1, preparation of self-repairing capsules, comprising the following sub-steps:
sub-step 1, preparation of solution 1: the same as in sub-step 1 of Embodiment 1;
sub-step 2, preparation of emulsion polymerization aqueous phase: nano-silica was added into deionized water, ultrasonic dispersed at 20 kHZ for 10 min, sodium alginate was added, and uniformly stirred to obtain emulsion polymerization aqueous phase with final mass fraction of nano-silica of 1% and final mass fraction of sodium alginate of 2.5%;
sub-step 3, 4 and 5 are the same as sub step 3, 4 and 5 described in step 1 of Embodiment 1:
According to the mass ratio of 2.25:1, the self-repairing capsule obtained in step 1 was mixed with chitosan to obtain an environment-friendly cement self-repairing system.

The environment-friendly cement self-repairing system and tap water were added into ordinary portland cement, and prepared according to GB/T19139-2012 and cured in a curing water bath at 30° C.±2° C. for 7 days; the mass ratio of an environment friendly cement self-repairing system to ordinary portland cement was 6:94, and the water-cement ratio was 0.4774.

Embodiment 5

A preparation method of environment-friendly cement self-repairing system, comprising the following steps:
step 1, preparation of self-repairing capsules, comprising the following sub-steps:
sub-step 1, preparation of solution 1: aluminum chloride was added into deionized water, and uniformly stirred to prepare a solution with the mass fraction of aluminum chloride of 2.66% as solution 1;
sub-step 2, preparation of emulsion polymerization aqueous phase: nano-calcium carbonate was added into deionized water, ultrasonic dispersed at 20 kHZ for 5 min, xanthan gum was added, and uniformly stirred to obtain emulsion polymerization aqueous phase with final mass fraction of nano-calcium carbonate of 1.5% and final mass fraction of xanthan gum of 1%;
sub-step 3, preparation of emulsion polymerization oil phase: phenyl glycidyl ether was added into epoxy resin and stirred evenly; and the emulsion polymerization oil phase with the mass fraction of phenyl glycidyl ether of 15% was obtained.
sub-step 4, emulsion preparation: the emulsion polymerization aqueous phase obtained in sub-step 2 was mixed with the emulsion polymerization oil obtained in sub-step 3 according to the mass ratio of 50:50, and stirred at 10000 rpm to obtain a uniform emulsion (about 10 min);
sub-step 5, preparation of self-repairing capsules: the homogeneous emulsion obtained in sub-step 4 was dropped into the solution 1 obtained in step 1) by pendant drop method, stirred until the droplets were shaped, filtered, washed with deionized water, and finally dried to obtain self-repairing capsules:
According to the mass ratio of 2.54:1, the self-repairing capsule obtained in step 1 was mixed with dopamine to obtain an environment-friendly cement self-repairing system.

The environment-friendly cement self-repairing system and tap water were added into ordinary portland cement, and prepared according to GB/T19139-2012 and cured in a curing water bath at 30° C.±2° C. for 7 days; the mass ratio of an environment friendly cement self-repairing system to ordinary portland cement was 6:94, and the water-cement ratio was 0.4874.

Embodiment 6

A preparation method of environment-friendly cement self-repairing system, comprising the following steps:
step 1, Preparation of self-repairing capsules, comprising the following sub-steps
sub-step 1, preparation of solution 1: calcium sulfate was added into deionized water, and stirred evenly to prepare a solution with 2.72% aluminum chloride mass fraction as solution 1;
sub-step 2, preparation of emulsion polymerization aqueous phase: bentonite was added into deionized water, ultrasonic dispersed at 20 kHZ for 15 min, sodium alginate was added, and uniformly stirred to obtain emulsion polymerization aqueous phase with final mass fraction of bentonite of 1.5% and final mass fraction of sodium alginate of 2.5%;
sub-step 3, preparation of emulsion polymerization oil phase: butyl glycidyl ether was added into epoxy resin and stirred evenly; then, an emulsion polymerization oil phase with the mass fraction of butyl glycidyl ether of 10% was obtained;
sub-step 4, emulsion preparation: the emulsion polymerization aqueous phase obtained in sub step 2 was mixed with the emulsion polymerization oil obtained in sub-step 3 according to the mass ratio of 75:25, and stirred at 12000 rpm to obtain a uniform emulsion (about 10 min);

sub-step 5, preparation of self-repairing capsules: the uniform emulsion obtained in sub-step 4 was dropped into the solution 1 obtained in sub-step 1 by pendant drop method, and stirred until the droplets were shaped, filtered, washed with deionized water, then dried to obtain self-repairing capsules;

step 2, according to the mass ratio of 2.54:1, the self-repairing capsule obtained in step (1) was mixed with lysine to obtain an environment-friendly cement self-repairing system.

The environment-friendly cement self-repairing system and tap water were added into ordinary portland cement, and prepared according to GB/T19139-2012 and cured in a curing water bath at 30° C.±2° C. for 7 days; the mass ratio of an environment friendly cement self-repairing system to ordinary portland cement was 6:94, and the water-cement ratio was 0.4874.

The environment-friendly cement self-repairing system and tap water was added into ordinary portland cement, and prepared according to GB/T 19139-2012 and cured in a curing water bath at 30° C.±2° C. for 7 days; the mass ratio of an environment friendly cement self-repairing system to ordinary portland cement is 6:94, and the water-cement ratio is 0.4874.

FIG. 1 is a cross-sectional scanning electron microscope diagram of a self-repairing capsule of an environment-friendly cement self-repairing system prepared in Embodiment 1. From A and B, it can be seen that the self-repairing capsule section of an environment friendly cement self-repairing system is filled with epoxy resin. From C, it can be seen that the self-repairing capsule after cleaning has an obvious core-shell structure, and the particle size of the capsule is about 1 mm. From D, it can be seen that the self-repairing capsule has a porous structure similar to a sponge, and the holes are interconnected, which can store a large amount of epoxy resin.

Figure 2:
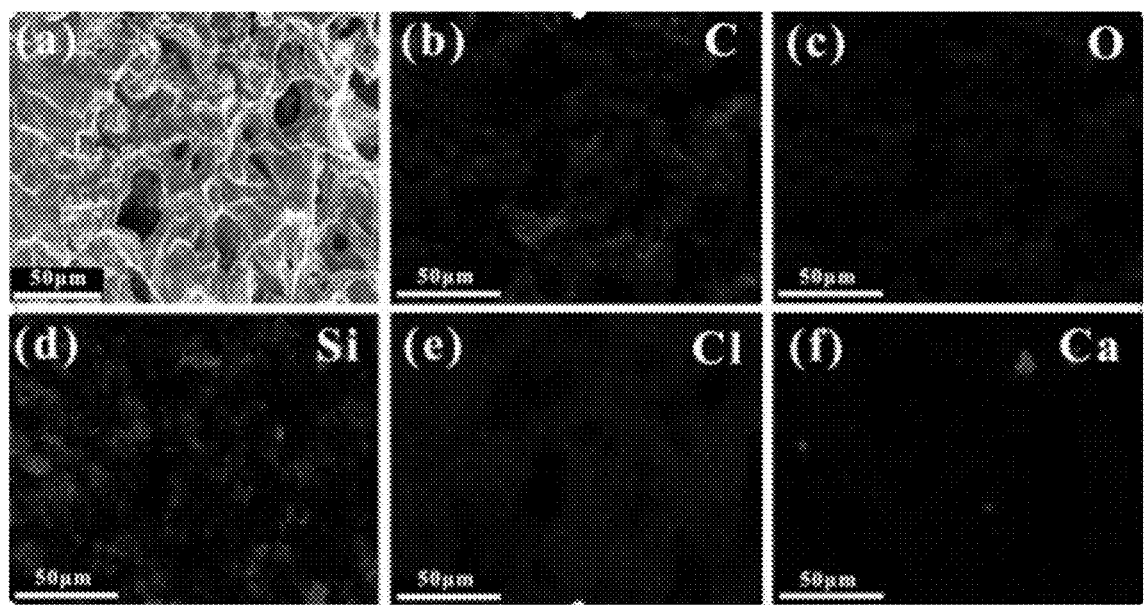
FIG. 2 illustrates X-ray energy spectrum analysis diagram of self-repairing capsule section of an environment-friendly cement self-repairing system prepared for Embodiment 1. Wherein (a) is a cross-sectional view aft cleaning; (b) is the distribution map of element C; (c) is the distribution map of element O; (d) is the distribution diagram of Si element; (e) is the distribution diagram of Cl element; (f) is the distribution map of Ca elements.

FIG. 2 is an X-ray energy spectrum analysis diagram of a self-repairing capsule section of an environment-friendly cement self-repairing system prepared in Embodiment 1. As can be seen from the Figure, the self-repairing capsule of an environment-friendly cement self-repairing system is mainly composed of C, O, Si, Cl and Ca. Si element is evenly distributed around the hole, which shows that nano-silica is evenly dispersed in the emulsification process and plays the role of emulsifier. Ca element is mainly distributed in sponge structure, indicating that the main composition of sponge structure inside is calcium alginate.

Figure 3:
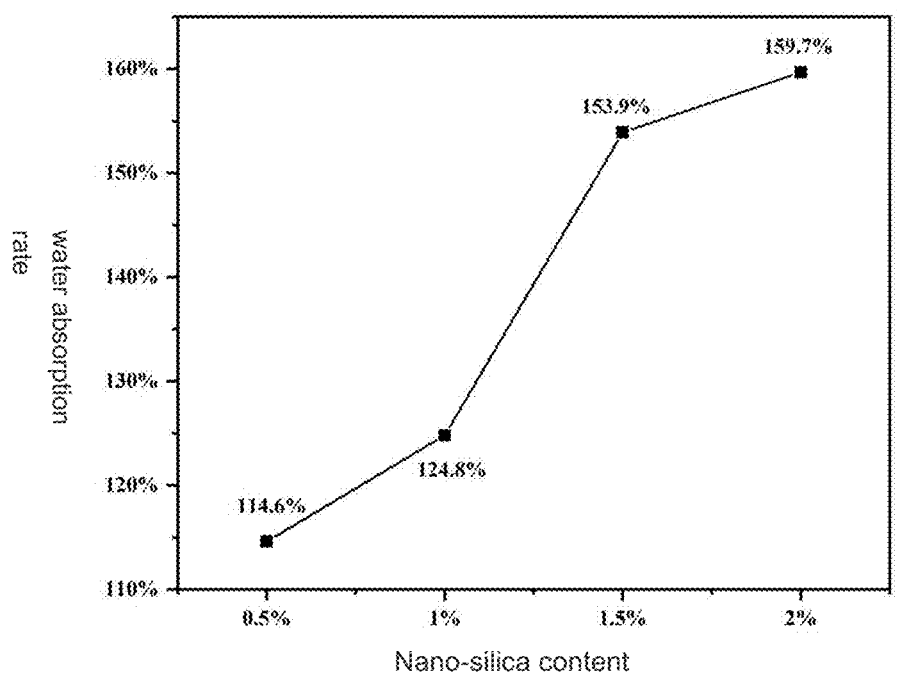
FIG. 3 illustrates the water absorption test of a self-repairing capsule of an environment-friendly cement self-repairing system with different nano-silica contents.

FIG. 3 shows the water absorption test of a self-repairing capsule of an environment-friendly cement self-repairing system with different nano-silica contents. As can be seen from the Figure, the water absorption of the self-repairing capsule of an environment-friendly cement self-repairing system increases with the increase of nano-silica content, and the water absorption of the capsule is generally higher than 110%, and the water absorption is the highest when the concentration of nano-silica is 2%, reaching 159.7%.

Figure 4:
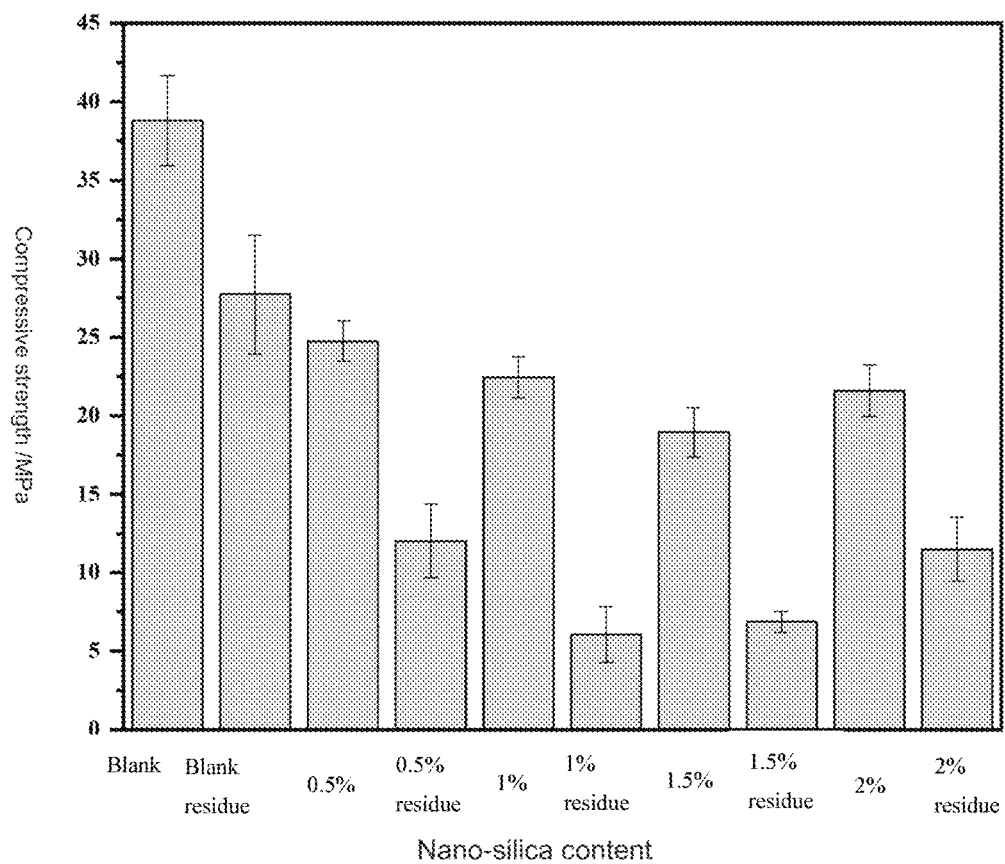
FIG. 4 illustrates the compressive strength of blank cement and an environment-friendly cement self-repairing system with different nano-silica contents and the residual compressive strength after 90% presplitting experiment.

FIG. 4 shows the compressive strength of blank cement and an environment-friendly cement self-repairing system with different nano-silica contents and the residual compressive strength after 90% presplitting experiment. As can be seen from the figure, the compressive strength of an environment-friendly cement self-repairing system is lower than that of the control group, which is because the addition of capsules increases the internal defects of cement, resulting in a decrease in compressive strength.

Figure 5:
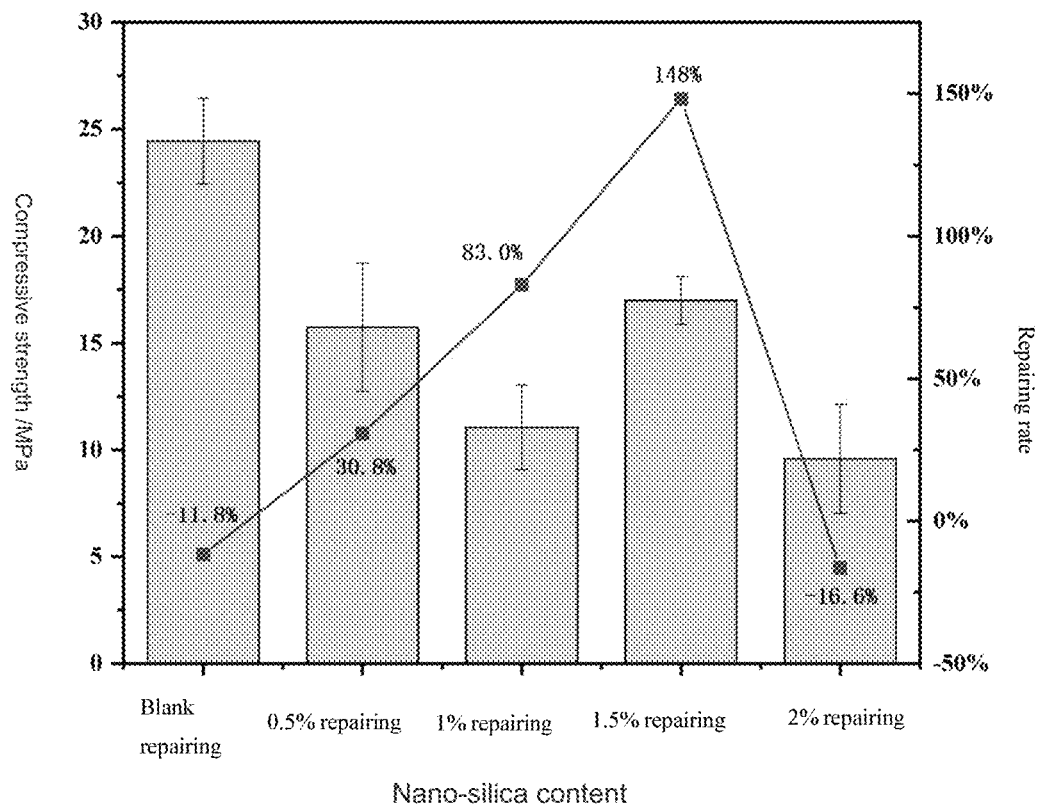
FIG. 5 illustrates the strength and repair rate of blank cement and an environment-friendly cement self-repair system with different nano-silica content after repair.

FIG. 5 shows the strength and repair rate of blank cement and an environment-friendly cement self-repair system with different nano-silica content after repair. As can be seen from the figure, after 90% presplitting experiment and 7 days of water curing, the self-repairing ability of an environment-friendly cement self-repairing system is obviously improved compared with that of the control group, in which the repairing rate is the highest, reaching 148%, and the compressive strength after repair reaches 89.7% of the original compressive strength.

Embodiment show that the water absorption of an environment-friendly cement self-repairing system prepared in Embodiment 5 and 6 is similar to that of an environment-friendly cement self-repairing system prepared in Embodiment 1.

Embodiment show that the repair rate of cement by an environment-friendly cement self-repairing system prepared in Embodiment 5 and 6 is similar to that by an environment-friendly cement self-repairing system prepared in Embodiment 1.

The environment-friendly cement self-repairing system has obvious self-repairing ability, and effectively overcomes the defects that the existing cement self-repairing system is toxic and harmful to human body and environment, and difficult to synthesize and expensive.

What is claimed is:

1. A preparation method of environment-friendly cement self-repairing system, comprising steps as follows:
    step 1, preparation of a self-repairing capsule, comprising the following sub-steps:
    sub-step 1, preparation of solution 1: adding an amount of deionized water into a shell curing agent, and uniformly stirring to obtain the solution 1 with the mass fraction of the shell curing agent of 2.22%-2.72%;
    sub-step 2, preparation of an emulsion polymerization aqueous phase: adding an inorganic nano-emulsifier into deionized water, ultrasonically dispersing for 5-15 min at 20 kHZ, adding a polysaccharide shell material, and uniformly stirring to obtain the emulsion polymerization aqueous phase with the mass fraction of the inorganic nano-emulsifier of 0.5%-1.5% and the mass fraction of the polysaccharide shell material of 1%-2.5%;
    sub-step 3, preparation of an emulsion polymerization oil phase: adding an epoxy diluent into an epoxy resin, and stirring evenly, obtaining the emulsion polymerization oil phase with the mass fraction of the epoxy diluent of 10%-20%;
    sub-step 4, preparation of an emulsion: mixing the emulsion polymerization aqueous phase obtained in sub-step 2 with the emulsion polymerization oil phase obtained in sub-step 3 according to the mass ratio of 75-50:25-50, and stirring at 10,000-12,000 rpm to obtain a homogeneous emulsion;
    sub-step 5, preparation of the self-repairing capsule: dropping the homogeneous emulsion obtained in sub-step 4 into the solution 1 obtained in sub-step 1 by pendant drop method, stirring until the droplets are shaped, and filtering, washing with deionized water, then drying to obtain the self-repairing capsule;
    step 2, mixing the self-repairing capsule and an environment-friendly curing agent according to the mass ratio of (2.15-2.54):1 to obtain an environment-friendly cement self-repairing system, wherein the inorganic nano-emulsifier is nano silicon dioxide, bentonite or nano calcium carbonate, and the environment-friendly curing agent is chitosan, dopamine or lysine.

2. The preparation method of environment-friendly cement self-repairing system as claimed in claim 1, wherein, the shell curing agent is calcium chloride, calcium sulfate or aluminum chloride.

3. The preparation method of environment-friendly cement self-repairing system as claimed in claim 1, wherein the polysaccharide shell material is sodium alginate or xanthan gum.

4. The preparation method of environment-friendly cement self-repairing system as claimed in claim 1, wherein the epoxy diluent is benzyl glycidyl ether, phenyl glycidyl ether or butyl glycidyl ether.

* * * * *